Aug. 19, 1930.                D. KILLEN                1,773,311
                        VACUUM FRUIT JAR COVER
                          Filed May 12, 1927

INVENTOR
Dan Killen
BY
Erwin, Wheeler Woolard
ATTORNEY

Patented Aug. 19, 1930

1,773,311

UNITED STATES PATENT OFFICE

DAN KILLEN, OF MILWAUKEE, WISCONSIN

VACUUM FRUIT-JAR COVER

Application filed May 12, 1927. Serial No. 190,710.

This invention relates to improvements in vacuum jar covers.

It is an object of this invention to provide for fruit jars a cover having a small aperture therethrough and a valve for sealing the aperture when air is withdrawn from the jar upon which the cover is placed.

More specifically stated, it is an object of this invention to provide for the cover an aperture having a margin with which the valve may come into substantially a line contact, thereby to form a more perfect seal when the valve is excluding air from a jar.

It is a further object of this invention to provide a valve of greater dimension than the aperture composed of a flexible material comparatively less flexible where it registers with the aperture than it is at other portions of the valve, thus insuring that all portions of the valve not immediately in registry with the aperture, will contact promptly with the cover and will not be wrinkled or puckered when the valve is excluding air from a jar.

These and other results will be apparent from the following description, references being made to the drawings forming a part of this specification, and in which Figure 1 is a fragmentary view in side elevation of a jar partly in section showing a cover embodying this invention.

Like parts are identified by the same reference characters throughout the several views.

Figure 1:
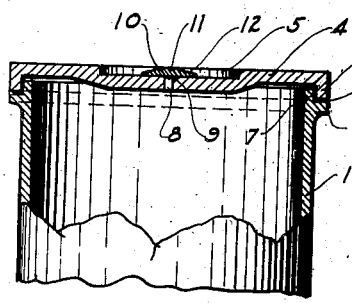
Figure 2:
Figure 2 is a view showing a modified form of cover.
Figure 3:
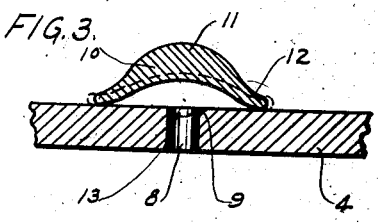
Figure 3 is an enlarged fragmentary sectional view of the cover and valve.
Figure 4:
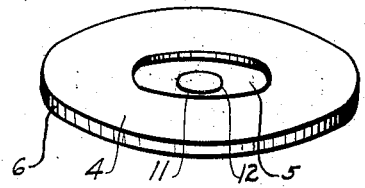
Figure 4 is a top view of the cover and valve as seen at an angle.

The jar is designated by the numeral 1 and is provided at its upper end with an annular flang 2 spaced below the upper margin of the jar. Upon the flange 2 is positioned a rubber band 3. The cover 4 is provided on its outer face with a central recess 5, and on its margin with an annular flange 6 adapted to receive the upper margin 7 of the jar and to rest upon the rubber band 3. The cover (Fig. 5) is also provided with a cylindrical aperture 8 concentric with the recess 5, the outer margin 9 of which is preferably comparatively sharp. The sharpness of this outer margin may be made more pronounced by tapering the aperture outwardly of the cover as shown at 9 in Fig. 2.

The valve 10 is preferably made of flexible rubber material and comprises a disc having a thickened central portion 11 and a comparatively thin marginal portion 12. It is also preferred that the valve be normally concaved when not in use.

The vacuum in the jar will be produced in the following manner: A rubber band 3 will be placed upon the annular flange 2, a cover 4 seated upon the band 3, a valve 10 seated over aperture 8 in the cover, and a vacuum pump of any desirable design (not shown) placed over the valve and the air in the jar withdrawn by means of the pump. The valve will then automatically seat itself into intimate contact with the cover. The pump will preferably be of such shape as to permit it to be centered over the valve by the marginal wall of the recess 5.

The advantages to be gained by the sharp margin of the aperture and from the particular form of valve shown are these: The sharp margin forms a substantial line contact with the valve and the pressure caused by the air upon the valve forces the sharp edge into the material of the valve and thereby forms a perfect seal. The thickened portion 11 of the valve offers a resistance to the air and prevents the valve from being drawn into the aperture 8 and beyond a line tending to cause the valve to warp at its outer margin 12. The dotted line 13 indicates the curvature that the valve may assume within aperture 8 when air is exerting pressure upon the valve.

If the valve were an ordinary concave disc having a uniform thickness of material throughout, the outer margins would tend to roll away from the cover and permit the valve to reverse the concave side, that is, where a face was previously concaved, it would now be convex. It will, therefore, be apparent that by thickening the central portion as indicated in the drawings, the valve will offer to the margin thereof additional strength and prevent it from curling upwardly from the cover when the concave face of the valve is drawn to a plane surface.

I claim:

1. As a new article of manufacture, a normally concave valve composed of flexible material of maximum thickness at its center and tapering in thickness substantially uniformly from its center to its margin.

2. The combination with a jar cover provided with a hole, of a normally concave valve composed of flexible material of maximum thickness at its center and tapering in thickness substantially uniformly from its center to its margin, and adapted to be drawn into linear marginal contact with said cover about said hole when subjected to depression communicated through said hole.

DAN KILLEN.